(12) United States Patent
Li

(10) Patent No.: US 12,170,737 B2
(45) Date of Patent: Dec. 17, 2024

(54) BLOCK PROCESSING METHOD AND APPARATUS, AND BLOCKCHAIN-BASED DATA QUERY METHOD AND APPARATUS

(71) Applicant: TENCENT TECHNOLOGY (SHENZHEN) COMPANY LIMITED, Guangdong (CN)

(72) Inventor: Xin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 414 days.

(21) Appl. No.: 17/675,511

(22) Filed: Feb. 18, 2022

(65) Prior Publication Data

US 2022/0171776 A1 Jun. 2, 2022

Related U.S. Application Data

(63) Continuation of application No. PCT/CN2020/126458, filed on Nov. 4, 2020.

(30) Foreign Application Priority Data

Feb. 18, 2020 (CN) .......................... 202010099538.8

(51) Int. Cl.
*H04L 9/32* (2006.01)
*G06Q 20/36* (2012.01)
*H04L 9/00* (2022.01)

(52) U.S. Cl.
CPC ........... *H04L 9/3297* (2013.01); *G06Q 20/36* (2013.01); *H04L 9/50* (2022.05)

(58) Field of Classification Search
CPC ......... H04L 9/3297; H04L 9/50; G06Q 20/36; G06Q 40/04; G06F 21/64; G06F 16/2282; G06F 16/2471; G06F 16/27
See application file for complete search history.

(56) References Cited

U.S. PATENT DOCUMENTS

2017/0163733 A1\* 6/2017 Grefen ................. H04L 9/3236
2019/0197474 A1 6/2019 Bennett et al.
(Continued)

FOREIGN PATENT DOCUMENTS

CN 108712491 A 10/2018
CN 108960823 A 12/2018
(Continued)

OTHER PUBLICATIONS

Translation of Written Opinion of the International Searching Authority dated Feb. 3, 2021 in International Application No. PCT/CN2020/126458.

(Continued)

*Primary Examiner* — Mark D Featherstone
*Assistant Examiner* — Kweku William Halm
(74) *Attorney, Agent, or Firm* — Sughrue Mion, PLLC

(57) ABSTRACT

The present disclosure is directed to a block processing method, apparatus, and non-transitory computer medium. The method includes obtaining a time interval stored in a root block of a target blockchain based on generation of a block. The method further includes determining a subchain as a target subchain, the subchain meeting a target condition from a first target quantity of subchains connected to the root block when a transaction occurrence time of a transaction included in the block being within the time interval. The method also includes adding the block to the target subchain of the target blockchain when a consensus is reached on the block.

17 Claims, 8 Drawing Sheets

(56) References Cited

U.S. PATENT DOCUMENTS

2020/0128043 A1\* 4/2020 Xie ................... H04L 9/3239
2021/0099315 A1\* 4/2021 Xu ................... H04L 9/3239

FOREIGN PATENT DOCUMENTS

| CN | 109213797 A | \* | 1/2019 |
|----|-------------|---|--------|
| CN | 110245190 A |   | 9/2019 |
| CN | 111339086 A |   | 6/2020 |
| CN | 108304475 B |   | 11/2020 |
| WO | 2019/072312 A2 |   | 4/2019 |
| WO | 2019/210711 A1 |   | 11/2019 |

OTHER PUBLICATIONS

International Search Report for PCT/CN2020/126458 dated Feb. 3, 2021.
Written Opinion for PCT/CN2020/126458 dated Feb. 3, 2021.
Japanese Office Action dated Jul. 25, 2023 in Japanese Application No. 2022-527689.
Extended European Search Report dated Jan. 9, 2023 in European Application No. 20919567.6.

\* cited by examiner

BLOCK PROCESSING METHOD AND APPARATUS, AND BLOCKCHAIN-BASED DATA QUERY METHOD AND APPARATUS

CROSS-REFERENCE TO RELATED APPLICATION(S)

The present disclosure is a continuation application of International Application No. PCT/CN2020/126458, filed Nov. 4, 2020, which claims priority to Chinese Patent Application No. 202010099538.8, filed with the China National Intellectual Property Administration on Feb. 18, 2020, the disclosures of which are incorporated by reference in their entireties.

FIELD

The present disclosure relates to the field of blockchain technologies, and in particular, to a block processing method, a blockchain-based data query method and apparatus, a computer device, and a storage medium.

BACKGROUND

A blockchain is essentially a decentralized database including a plurality of blocks connected in series. In the existing blockchain construction method, blocks on which consensus is reached are connected in an order of generation time to form a blockchain, and a newly generated block on which consensus is reached can be connected to the tail of the blockchain.

SUMMARY

Embodiments of the present disclosure provide a block processing method and apparatus, a blockchain-based data query method and apparatus, a computer device, and a storage medium. The technical solutions are as follows:

According to an aspect of an example embodiment, a block processing method is provided, the block processing including: obtaining, in response to generation of a block, a time interval stored in a root block of a target blockchain; determining, based on a transaction occurrence time of a transaction included in the block being within the time interval, a subchain meeting a target condition from a first target quantity of subchains connected to the root block as a target subchain; and adding the block to the target subchain of the target blockchain based on a consensus being reached on the block.

According to an aspect of an example embodiment, a blockchain-based data query method is provided. The blockchain-based data query method includes: obtaining a block index table of a target blockchain in response to a query instruction for a target block in the target blockchain, the query instruction carrying a transaction occurrence time of a transaction included in the target block, data storage units in the block index table being configured to record storage location information of blocks in the target blockchain, and one data storage unit corresponding to one time identifier; determining a target data storage unit from the block index table, a time identifier of the target data storage unit matching the transaction occurrence time; and searching the target blockchain for the target block based on storage location information in the target data storage unit.

According to an aspect of an example embodiment, an apparatus for block processing is provided. The apparatus includes at least one memory configured to store computer program code; at least one processor configured to access the computer program code and operate as instructed by the computer program code, the computer program code including: first obtaining code configured to cause the at least one processor to obtain, in response to generation of a block, a time interval stored in a root block of a target blockchain; first determining code configured to cause the at least one processor to determine, based on a transaction occurrence time of a transaction included in the block being within the time interval, a subchain meeting a target condition from a first target quantity of subchains connected to the root block as a target subchain; and first adding code configured to cause the at least one processor to add, the block to the target subchain of the target blockchain based on a consensus being reached on the block.

According to an aspect of an example embodiment, a computer device is provided, including one or more processors and one or more memories storing at least one computer program, the at least one computer program being loaded and executed by the one or more processors to implement the operations performed in the block processing method or the blockchain-based data query method.

According to an aspect of an example embodiment, a computer-readable storage medium is provided, storing at least one computer program, the at least one computer program being loaded and executed by a processor to implement the operations performed in the block processing method or the blockchain-based data query method.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings according to these accompanying drawings without creative efforts.

DETAILED DESCRIPTION

Figure 1:
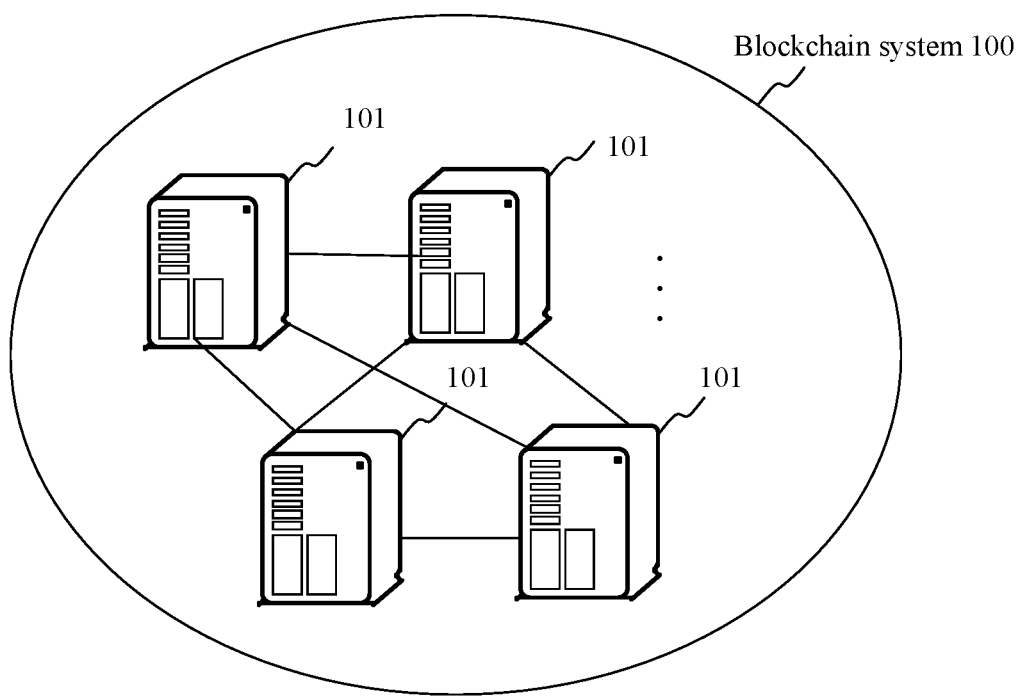
FIG. 1 is a schematic diagram of a blockchain system 100 according to an embodiment of the present disclosure.

To make objectives, technical solutions, and advantages of the present disclosure clearer, implementations of the present disclosure are further described in detail below with reference to the accompanying drawings.

A blockchain is a novel application mode of computer technologies such as distributed data storage, peer-to-peer (P2P) transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include a blockchain underlying platform, a platform product service layer, and an application service layer.

The blockchain underlying platform may include processing modules such as a user management module, a basic service module, a smart contract module, and an operation monitoring module. The user management module is responsible for identity information management of all blockchain participants, including maintaining public-private key generation (account management), key management, maintaining a correspondence between the real identity of a user and a blockchain address (permission management), and the like, supervising and auditing transactions of some real identities with authorization, and providing rule configuration of risk control (risk control auditing). The basic service module is deployed on all blockchain node devices and configured to verify the validity of a service request, and after consensus is reached on a valid request, record the valid request in storage. For a new service request, the basic service module first performs adaptive parsing and authentication processing on an interface (interface adaptation), then encrypts service information by using a consensus algorithm (consensus management), transmits the complete and consistent service information after encryption to a shared ledger (network communication), and performs recording and storing. The smart contract module is responsible for contract registration and publication, contract trigger, and contract execution. A developer may define contract logic by using a programming language, and release the contract logic onto a blockchain (contract registration). According to the logic of contract terms, a key or another event is invoked to trigger execution, to complete the contract logic. In addition, the function of upgrading or canceling a contract is further provided. The operation monitoring module is mainly responsible for deployment, configuration modification, contract setting, and cloud adaptation during product releasing, and visualized output of a real-time status during product operation, for example, alarming, monitoring a network status, and monitoring a health status of a node device.

The platform product service layer provides basic capabilities and an implementation framework of a typical application. Based on these basic capabilities, a developer may superpose characteristics of services and complete blockchain implementation of service logic. The application service layer provides a blockchain solution-based application service for a service participant to use.

During blockchain construction, since time periods required for adding blocks to the blockchain are different, adding blocks to the blockchain may take a relatively long time due to timeout of a specific transaction in a block. To ensure a correct connection order of the blocks in the blockchain, when a block has been generated, but consensus has not been reached and the block has not been added to the blockchain, a plurality of blocks generated after the block cannot be connected to the blockchain even if consensus has been reached. Consequently, a large quantity of blocks cannot be added to the blockchain in time, affecting the normal operation of the blockchain system.

Therefore, during blockchain construction, how to process blocks to add the block on which consensus is reached to the blockchain in time and ensure the normal operation of the blockchain system is an important research direction.

An embodiment of the present disclosure provides a blockchain system 100 implemented based on blockchain technologies, and a system architecture of the blockchain system is described below.

FIG. 1 is a schematic diagram of a blockchain system 100 according to an embodiment of the present disclosure. Referring to FIG. 1, the blockchain system 100 may include a plurality of node devices 101. In addition, the blockchain system 100 may further include at least one client.

The node device 101 may be a computing device in any form in a network, for example, a server, a host, or a user terminal. Data can be shared between the node devices 101. A P2P network may be established between the node devices 101 based on a P2P protocol. The P2P protocol is an application-layer protocol running on the transmission control protocol (TCP).

In some embodiments, the device type of the node device 101 may include at least one of a smartphone, a tablet computer, an e-book reader, a moving picture experts group audio layer III (MP3) player, a moving picture experts group audio layer IV (MP4) player, a laptop portable computer, a desktop computer, or the like.

Each node device 101 may receive input information during normal operation, and maintain shared data in the blockchain system based on the received input information. To ensure information to be exchanged in the blockchain system, there may be information connections between node devices in the blockchain system, and the node devices may transmit information to each other through the information connections. For example, when any node device in the blockchain system receives input information, another node device in the blockchain system may also obtain the input information, and stores the input information as data in shared data, so that consistent data is stored in all node devices in the blockchain system.

A functional architecture of the node device 101 is described below.

Figure 2:
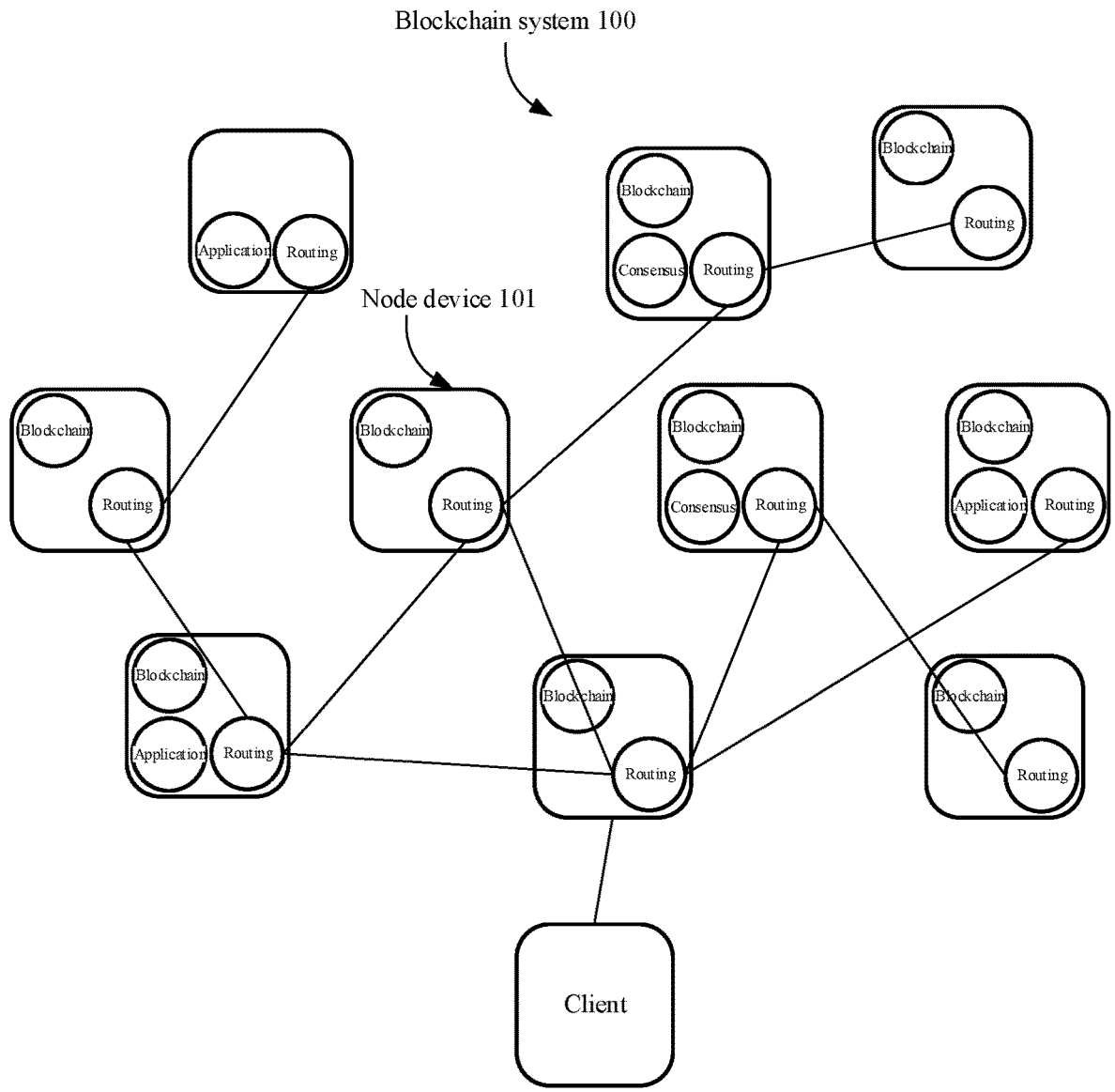
FIG. 2 is a functional architecture diagram of a node device according to an embodiment of the present disclosure.

FIG. 2 is a functional architectural diagram of a node device according to an embodiment of the present disclosure. The node device 101 may be functionally divided into a hardware layer, an intermediate layer, an operating system layer, and an application layer, and involved functions may be specifically as follows:

(1) Routing is a basic function of a node device, and is used for supporting communication between node devices.

In addition to the routing function, the node device may further have the following functions:

(2) An application is deployed in a blockchain, and is used for implementing a particular service according to an actual service requirement, recording data related to function implementation to form recorded data, adding a digital signature to the recorded data to represent a source of task data, and transmitting the recorded data to another node device in the blockchain system, so that the another node device adds the recorded data to a temporary block when successfully verifying a source and integrity of the recorded data.

For example, services implemented by the application include:

(2.1) A wallet is used for providing a function of performing a transaction with electronic money, including transaction initiation (that is, a transaction record of a current transaction is transmitted to another node device in the blockchain system, and the another node device writes, after successfully verifying the transaction record, recorded data of the transaction into a temporary block of the blockchain as a response to admitting that the transaction is valid). In some embodiments, the wallet further supports querying for remaining electronic money in an electronic money address.

(2.2) A shared ledger is used for providing functions of operations such as storage, query, and modification of account data. Recorded data of the operations on the account data is transmitted to another node device in the blockchain system. The another node device writes, after verifying that the account data is valid, the recorded data to a temporary block as a response to admitting that the account data is valid, and may further transmit an acknowledgement to a node device initiating the operations.

(2.3) A smart contract is a computerized protocol, may be used for executing terms of a contract, and is implemented by using code that is deployed in the shared ledger and that is executed when a condition is met. According to an actual service requirement, the code is used for completing an automated transaction, for example, querying for a delivery status of goods purchased by a purchaser, and transferring electronic money of the purchaser to the address of the merchant after the purchaser signs for the goods. The smart contract is not limited to executing a contract used for a transaction, or may executing a contract used for processing received information.

(3) A blockchain includes a series of blocks that are consecutive in a chronological order of generation. Once a block is added to the blockchain, the block is no longer removed. The block records recorded data submitted by the node device in the blockchain system.

It may be understood that the methods provided in the embodiments of the present disclosure may be implemented by the node device. The node device is a computer device, including but not limited to, a server or a terminal.

Figure 3:
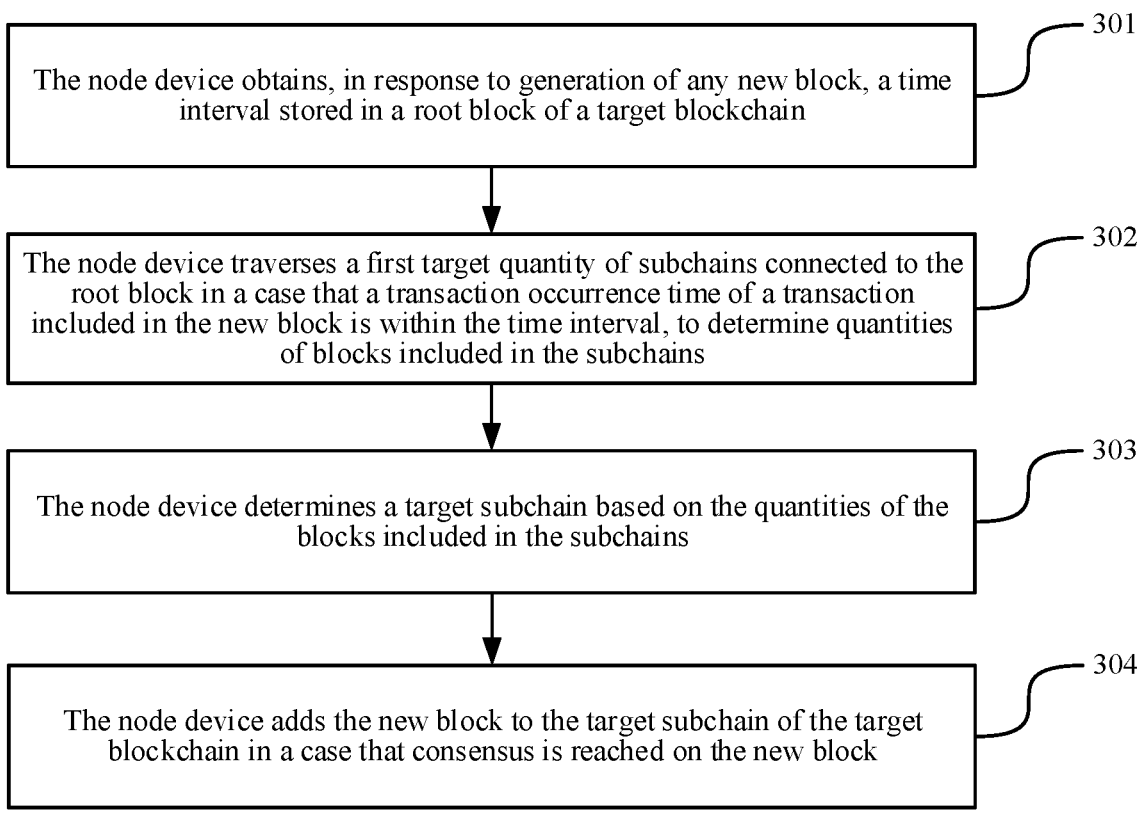
FIG. 3 is a flowchart of a block processing method according to an embodiment of the present disclosure.

FIG. 3 is a flowchart of a block processing method according to an embodiment of the present disclosure. In this embodiment of the present disclosure, description is made by using an example in which the method is applied to the node device in the above-mentioned blockchain system. Referring to FIG. 3, the method may specifically include the following:

At operation 301. The node device obtains, in response to generation of any new block, a time interval stored in a root block of a target blockchain.

The "new block" involved in this embodiment of the present disclosure refers to a block generated in the blockchain system at the latest moment, and any newly-generated block is referred to as the "new block". The "root block" involved in this embodiment of the present disclosure refers to the first block generated in the blockchain system, which is also referred to as a "genesis block". That is, in operation 301, the node device obtains, in response to generation of any block, a time interval stored in a root block of a target blockchain.

Figure 4:
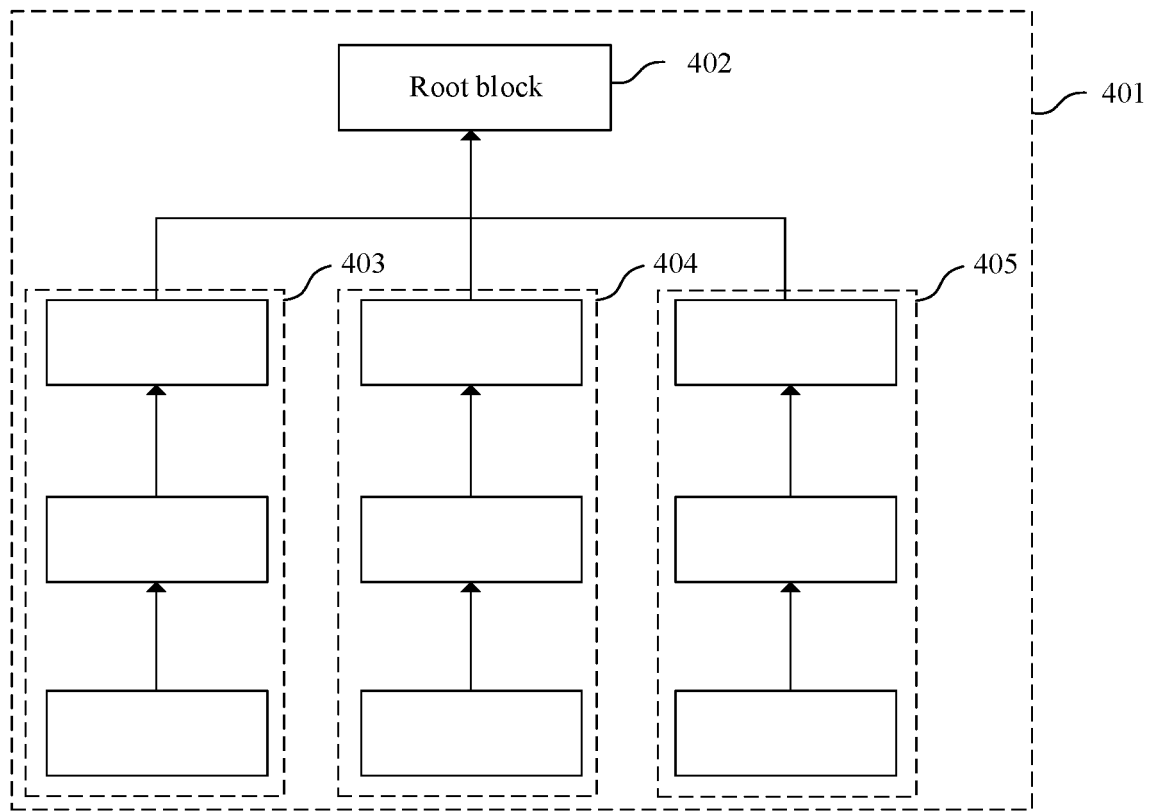
FIG. 4 is a schematic diagram of a target blockchain according to an embodiment of the present disclosure.

The node device may be, but is not limited to, any node device in the blockchain system. The node device may be a terminal, a server, or the like. The target blockchain belongs to the blockchain system. In some embodiments, the blockchain system may further include another blockchain. This is not limited in this embodiment of the present disclosure. FIG. 4 is a schematic diagram of a target blockchain according to an embodiment of the present disclosure. A target blockchain 401 is of a tree structure, that is, the target blockchain 401 includes a root block 402 and a plurality of subchains connected to the root block 402. As shown in FIG. 4, a subchain 403, a subchain 404, and a subchain 405 may be connected to the root block 402, and one subchain may include at least one block. In this embodiment of the present disclosure, the blockchain system may include at least one blockchain, and a structure of each blockchain is the same as a structure of the target blockchain.

In this embodiment of the present disclosure, a time interval is stored in the root block of the target blockchain. The time interval may be used for limiting a transaction occurrence time of each block included in the target blockchain, and transaction data of the transaction occurrence time within the time interval may be stored in the target blockchain. Generally, the blockchain system may generate blocks according to a block generation cycle, and a new block may be generated in each block generation cycle. Each block generation cycle may correspond to one transaction occurrence time period, and transactions that occur in the transaction occurrence time period are all recorded in the same block. For example, a transaction that occurs within the first second is recorded in one block, and a transaction that occurs within the second second is recorded in another block. Therefore, a quantity of blocks included in the target blockchain may be determined according to the time interval stored in the root block, to control a data storage volume of the blockchain. Time intervals stored in different root blocks may have the same or different lengths. That is, quantities of blocks included in different blockchains may be the same or different. The block generation cycle may be used for indicating a packaging cycle of transaction data in the blockchain system. For example, transaction data generated per second is packed into one block, that is, the block generation cycle refers to generating one block per second. The block generation cycle may be set by a developer. This is not limited in this embodiment of the present disclosure.

In a possible implementation, the root block may not store the transaction data. Therefore, in the blockchain system, a root block of each blockchain may be generated previously. That is, before a time interval corresponding to a root block ends, the root block may be generated. For example, when a time interval corresponding to a root block is from 23:00 to 24:00, the blockchain system may generate the root block at any moment before 23:00. The any moment may be randomly determined, or may be determined based on a running status of the blockchain system. For example, the root block may be generated when data processing pressure is relatively low. A specific generation moment of the root block is not limited in this embodiment of the present disclosure.

At operation 302. The node device traverses a first target quantity of subchains connected to the root block when a transaction occurrence time of a transaction included in the new block is within the time interval, to determine quantities of blocks included in the subchains.

In this embodiment of the present disclosure, the first target quantity may be determined based on an average block consensus time and a block generation cycle in a blockchain system to which the target blockchain belongs. For example, the first target quantity may be determined based on an operation result of dividing the average block consensus time by one block generation cycle. The first target quantity is equal to the operation result when the operation result is an integer, and the first target quantity is equal to the operation result plus one when the operation result is not an integer. The average block consensus time may be determined by collecting statistics on a time of reaching consensus on each block in the blockchain system.

In a possible implementation, the quantity of the blocks included in the subchains may be determined based on a block number of each block. Each block in the target blockchain may correspond to one block number, and the block number may be used for indicating a storage location of the block in the target blockchain. A block number of one block may consist of a subchain number of a subchain to which the block belongs and a sequence number of the block in the subchain, and the sequence number is an arrangement order of the block in the subchain to which the block belongs. For example, a block number of one block may be 2.3, and a subchain number of the block in a subchain to which the block belongs is 2. The block is the third block in the subchain to which the block belongs. In this embodiment of the present disclosure, when traversing each subchain, the node device may obtain a block number of the last block in the each subchain, and the quantity of the blocks included in the each subchain is determined based on a sequence number of the block number of the last block. A maximum value of the subchain number is equal to the first target quantity.

In this embodiment of the present disclosure, a blockchain may include a plurality of subchains, and blocks may be added to all subchains to improve the adding efficiency of the blocks and improve a concurrent processing capability of the system.

At operation 303. The node device determines a target subchain based on the quantities of the blocks included in the subchains.

In a possible implementation, the subchain with a minimum quantity of the blocks is determined as the target subchain if the quantities of the blocks included in the subchains are different; and one of the subchains is randomly determined as the target subchain if the quantities of the blocks included in the subchains are the same. In this embodiment of the present disclosure, a subchain including the fewest blocks, i.e., a subchain with a shortest length, is used as the target subchain, and a subsequent operation of adding blocks is performed on the target subchain, so that lengths of the subchains in the target blockchain may be balanced, and the lengths of the subchains may be substantially the same from the perspective of a relatively long cycle.

In other words, the node device determines the subchain with a minimum quantity of the blocks as the target subchain in response to different quantities of the blocks included in the subchains. Alternatively, the node device randomly determines one of the subchains as the target subchain in response to the same quantities of the blocks included in the subchains.

Operation 302 and operation 303 are an operation of traversing a first target quantity of subchains connected to the root block when a transaction occurrence time of a transaction included in the new block is within the time interval, and determining the subchain meeting a target condition as a target subchain. The new block refers to any block generated in the blockchain system at the latest moment. In other words, operation 302 and operation 303 are possible implementations in which the node device determines, when a transaction occurrence time of a transaction included in the any block is within the time interval, the subchain meeting a target condition from a first target quantity of subchains connected to the root block as a target subchain.

The target condition may be set by a developer. This is not limited in this embodiment of the present disclosure. For example, in this embodiment of the present disclosure, the target condition may be set to that the subchain includes a minimum quantity of the blocks. In the above-mentioned technical solutions, the subchains are screened based on the target condition to determine a target subchain to add a new block. According to such method for determining a target subchain, a structure of the blockchain may be more proper. For example, when the target condition is that the subchain includes a minimum quantity of the blocks, lengths of the subchains in the blockchain may be in a relatively balanced status.

At operation 304. The node device adds the new block to the target subchain of the target blockchain when consensus is reached on the new block.

The new block refers to any block generated in the blockchain system at the latest moment. That is, in operation 304, the node device adds the any block to the target subchain of the target blockchain when consensus is reached on the any block.

In this embodiment of the present disclosure, the node device in the blockchain system may determine a block number of the new block based on a subchain number of the target subchain and a sequence number of the block in the target subchain, and add the new block carrying the block number to the target subchain. The node device may be a leader node device in a consensus node device.

The new block refers to any block generated in the blockchain system at the latest moment. In other words, the node device determines a block number of the any block based on a subchain number of the target subchain and a sequence number of the block in the target subchain, and adds the any block carrying the block number to the target subchain.

In a possible implementation, the node device may add the block number to the new block when consensus is reached on the new block, that is, it is determined that the new block may be stored to the target subchain. Optionally, the node device may add one to a sequence number of a block with a maximum block height in the target subchain, to obtain a sequence number of the new block; and splice the subchain number of the target subchain and the sequence number of the new block, to obtain a block number of the new block in the target blockchain. The new block refers to any block generated in the blockchain system at the latest moment. In other words, the node device adds one to a sequence number of a block with a maximum block height in the target subchain, to obtain a sequence number of the any block; and splices the subchain number of the target subchain and the sequence number of the any block, to obtain a block number of the any block in the target blockchain.

For example, when a subchain number of the target subchain is 2 and a sequence number of a block with a maximum block height in the target subchain is 3, a block number of the new block may be 2.4. The sequence number is used for indicating an arrangement order of the block in the target subchain, and the block number is used for indicating a storage location of the new block in the target blockchain. In this embodiment of the present disclosure, after block numbers are generated, the consensus node device in the blockchain system may verify a block number of each block based on a generation rule of the block numbers. The above-mentioned description of the method for constructing block numbers is merely an exemplary description, and which method for constructing block numbers is specifically adopted is not limited in this embodiment of the present disclosure.

Figure 5:
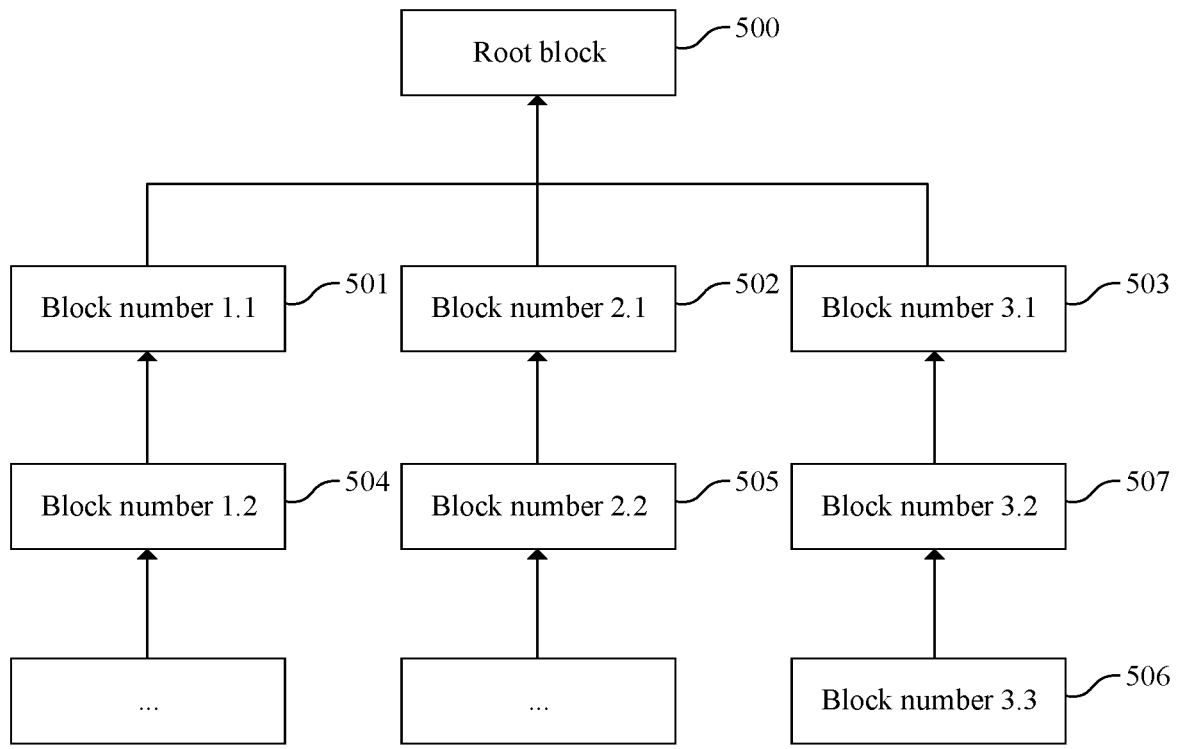
FIG. 5 is a schematic diagram of a data structure of a target blockchain according to an embodiment of the present disclosure.

FIG. 5 is a schematic diagram of a data structure of a target blockchain according to an embodiment of the present disclosure. The target blockchain shown in FIG. 5 is used as an example to describe a block number generation process. A root block 500 in the target blockchain stores a time interval, and when a block generation cycle in the blockchain system is set to 1 second and an average block consensus time is 3 seconds, a first target quantity corresponding to the target blockchain is 3, that is, a quantity of included subchains is 3. When the first block 501 is generated within the time interval, if there is no another block added to the target blockchain other than the root block, the first block 501 on which consensus is reached may be connected to the root block to form one subchain. A subchain number of the subchain is 1, and a block number of the first block 501 is 1.1. After consensus is reached on the second block 502, if the first block 501 has been added to the target blockchain, and a quantity of subchains in the target blockchain does not reach the first target quantity, the second block 502 may be connected to the root block to form one subchain. A subchain number of the subchain is 2, and a block number of the second block 502 is 2.1. A block addition process of the third block 503 is the same as the block addition process of the second block 502, and details are not repeated herein again. After the fourth block 504 is generated, if the target blockchain has included a target quantity of subchains, and quantities of blocks in the subchains are the same, the fourth block 504 may randomly select one subchain to complete a block addition process. For example, the fourth block 504 may select a subchain with a subchain number of 1, and a block number of the fourth block 504 is 1.2. A block addition process of the fifth block 505 is the same as the block addition process of the fourth block 504, and details are not repeated herein again. After the sixth block 506 is generated, if a subchain with a subchain number of 3 has a shortest length in the current target blockchain, after consensus is reached on the sixth block 506, the sixth block 506 needs to be added to the subchain with the subchain number of 3. A consensus process of the sixth block 506 takes a relatively long time, and consensus is reached on the sixth block 506 after consensus is reached on the seventh block 507. Therefore, when consensus is reached on the seventh block 507, if the subchain with the subchain number of 3 still has the shortest length in the current target blockchain, the seventh block 507 is added to the target blockchain and connected to the subchain with the subchain number of 3, and a block number of the seventh block 507 is 3.2. The sixth block 506 on which consensus is reached is also connected to the subchain with the subchain number of 3, and a block number of the sixth block 506 is 3.3.

In this embodiment of the present disclosure, the new block is added to the tail of the target subchain. To be specific, an adding location of the new block may be further verified after the new block is connected to a block with a maximum block height in the target subchain. In a possible implementation, the node device may determine a previous block of the new block as a candidate block; compare a sequence number of the candidate block with a sequence number of the new block; and redetermine the adding location of the new block when a sequence number of the candidate block and the sequence number of the new block are not continuously incremented, that is, the new block is not connected to the tail of the target subchain, and perform the operation of adding the new block to the target subchain. Such verification mechanism can ensure that the sequence numbers of the blocks in the subchains are continuously incremented, to avoid subchain diverging and avoid block disorder.

The new block refers to any block generated in the blockchain system at the latest moment. In other words, the verification mechanism of the node device refers to: determining a previous block of the any block as a candidate block; and redetermining the adding location of the any block when a sequence number of the candidate block and the sequence number of the any block are not continuously incremented, and perform the operation of adding the any block to the target subchain.

The specific method for adding the new block to the target subchain is not limited in this embodiment of the present disclosure.

In the above-mentioned technical solutions, sequence numbers are added for blocks and storage locations of the blocks are verified based on the sequence numbers, so that block disorder in subchains can be effectively avoided, and subchain diverging can be avoided, ensuring a correct storage location of each block and smooth data query and verification processes in the blockchain system.

In the technical solutions provided in this embodiment of the present disclosure, a time interval stored in a root block of a target blockchain is obtained in response to generation of any new block; when a transaction occurrence time of a transaction included in the new block is within the time interval, the subchain meeting a target condition is determined as a target subchain by traversing a first target quantity of subchains connected to the root block; and the new block is added to the target subchain of the target blockchain when consensus is reached on the new block. In the above-mentioned technical solutions, the blocks are connected to the blockchain according to a consensus time of the blocks without waiting for the completion of consensus of previously generated blocks. The blockchain is constructed in a tree structure and includes a plurality of subchains, and the blocks can be added to the plurality of subchains at the same time, so that the block adding efficiency is improved, and the blocks can be added to the blockchain in time, ensuring the normal operation of the blockchain system.

Generally, when blocks in the blockchain reach a specific quantity, the efficiency of data query may be affected, affecting the system operation. In the above-mentioned blockchain system, each blockchain is constructed in a tree structure including a root block and a plurality of subchains. A quantity of blocks of each blockchain may be flexibly controlled based on a time interval stored in the root block of each blockchain, avoiding increasing difficulty in data query due to an excessive quantity of blocks stored in one blockchain, and ensuring good system operation. Based on the above-mentioned technical solutions, each root block may be indexed. To be specific, a root block index table may be maintained in the blockchain system, and the index table is used for recording information such as a storage location and a time interval of each root block. A specific construction method for the root block index table is not limited in this embodiment of the present disclosure.

The above-mentioned embodiments mainly describe a blockchain construction method. A tree-shaped blockchain including a plurality of subchains is constructed, so that the block adding efficiency can be improved, and a concurrent processing capability of the blockchain system can be improved. In this embodiment of the present disclosure, during blockchain construction, a block index table associated with the target blockchain may be maintained in the blockchain system. The block index table may record storage location information of blocks in the target blockchain, facilitating data query on the target blockchain.

In this embodiment of the present disclosure, the node device may store storage location information of the new block to a block index table of the target blockchain when consensus is reached on the new block. The block index table is used for recording block information of each block in the target blockchain. The storage location information may be a block number.

The new block refers to any block generated in the blockchain system at the latest moment. In other words, the node device stores storage location information of the any block to a block index table of the target blockchain.

In a possible implementation, the block index table includes a second target quantity of data storage units, and one data storage unit corresponds to one time identifier. One data storage unit may store data in a fixed length, and block information such as storage location information of blocks may be stored in the data in a fixed length. The length of data stored in the data storage unit may be adjusted when block information to be stored in the block index table increases or decreases. A specific value of the second target quantity and the fixed length may be set by a developer. This is not limited in this embodiment of the present disclosure. For example, when the block generation cycle is generating one block per second, the second target quantity may be set to 60, and a block index table includes 60 data storage units. That is, blocks generated per minute are stored in the same block index table.

In an embodiment of the present disclosure, the node device determines, when a time identifier of any data storage unit in the block index table matches the transaction occurrence time of the transaction included in the new block, the any data storage unit as a target data storage unit; and stores the storage location information of the new block to the target data storage unit of the block index table.

The new block refers to any block generated in the blockchain system at the latest moment. In other words, the node device stores the storage location information of the any block to the target data storage unit of the block index table. A time identifier of the target data storage unit matches the transaction occurrence time of the transaction included in the any block.

Figure 6:
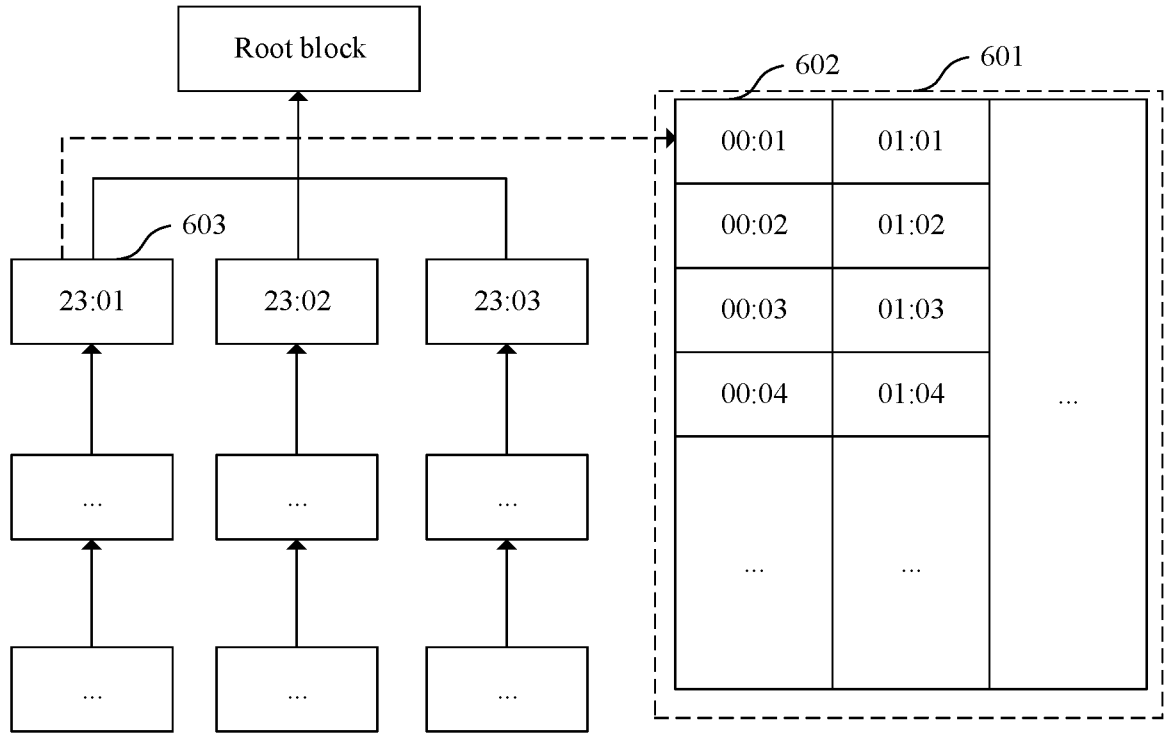
FIG. 6 is a schematic structural diagram of a target blockchain and a block index table according to an embodiment of the present disclosure.

In a possible implementation, the time identifier may be a time offset relative to a start moment of a time interval. For example, when a time interval is from 23:00 to 24:00, and a time identifier is 00:01, that is, a time offset relative to 23:00 is 00:01, a transaction occurrence time 23:01 may match the time identifier, and storage location information of a block storing transaction data generated at 23:01 may be recorded in a data storage unit corresponding to the time identifier 00:01. FIG. 6 is a schematic structural diagram of a target blockchain and a block index table according to an embodiment of the present disclosure. When a time interval is from 23:00 to 24:00, storage location information of a block 603 generated at 23:01 may be stored in a data storage unit 602 in a block index table 601. The above-mentioned description of the method for storing block information to a block index table is merely an exemplary description, and which storage method is specifically adopted is not limited in this embodiment of the present disclosure. The time identifier may alternatively be set as a specific moment within the time interval. For example, the time identifier may be set to 23:01. A specific form of the time identifier is not limited in this embodiment of the present disclosure.

In some embodiments, the data storage unit may further store other data information of blocks, for example, hash values of the blocks. This is not limited in this embodiment of the present disclosure.

The block index table is maintained in the blockchain system, so that block information of each block, e.g., a storage location of each block, may be recorded in an order of a transaction occurrence time of a transaction included in the each block, facilitating query and verification on each block in the blockchain system.

Figure 7:
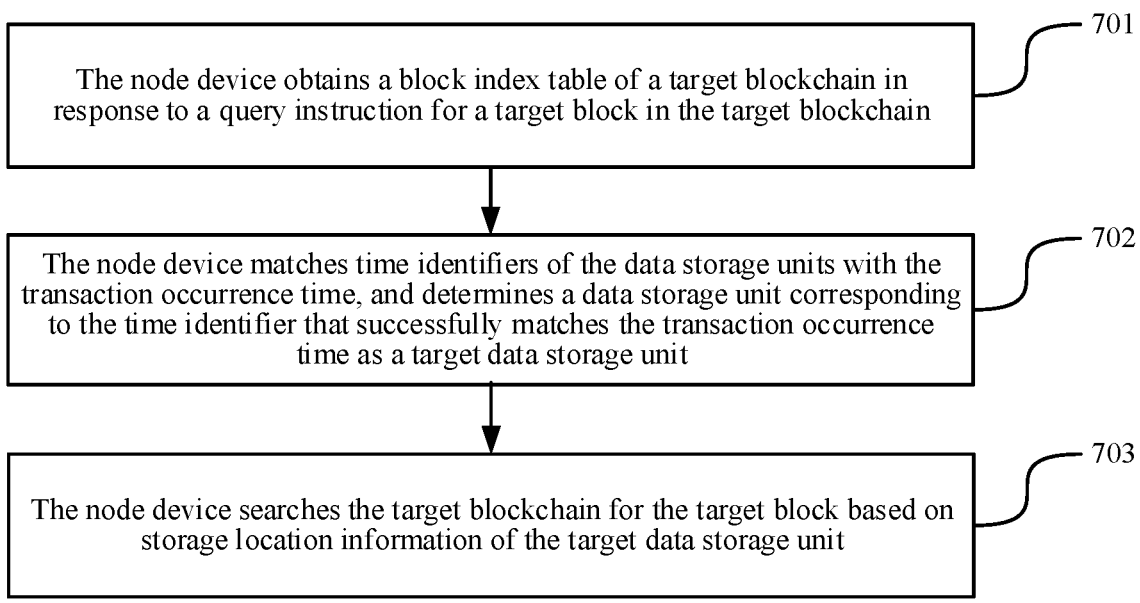
FIG. 7 is a flowchart of a blockchain-based data query method according to an embodiment of the present disclosure.

Based on the above-mentioned technical solutions, when data in the target blockchain is queried, a queried block storage location may be determined based on a block index table corresponding to the target blockchain. FIG. 7 is a flowchart of a blockchain-based data query method according to an embodiment of the present disclosure. Referring to FIG. 7, in a possible implementation, the method may specifically include the following operations.

At operation 701. A node device obtains a block index table of a target blockchain in response to a query instruction for a target block in the target blockchain.

In a possible implementation, the query instruction may carry a transaction occurrence time of a transaction included in the target block, data storage units in the block index table are configured to record storage location information of blocks in the target blockchain, and one data storage unit corresponds to one time identifier. A construction manner of the block index table herein is the same as the construction manner of the block index table in the above-mentioned embodiments, and details are not described herein again.

At operation 702. The node device matches time identifiers of the data storage units and the transaction occurrence time, and determines a data storage unit corresponding to the time identifier that successfully matches the transaction occurrence time as a target data storage unit.

That is, operation 702 is a possible implementation in which the node device determines a target data storage unit from the block index table. A time identifier of the target data storage unit matches the transaction occurrence time.

In a possible implementation, the time identifier may be set as a time offset relative to a start moment of a time interval. When the time identifier matches a transaction occurrence time of a transaction included in a block, the node device may obtain a time interval stored in a root block of the target blockchain; and determine a time offset of the transaction occurrence time relative to the start moment of the time interval. When any time identifier is the same as the time offset, the node device determines that the any time identifier successfully matches the transaction occurrence time; and determines a data storage unit corresponding to the any time identifier as the target data storage unit.

In other words, in the above-mentioned process, the node device obtains a time interval stored in a root block of the target blockchain; determines a time offset of the transaction occurrence time relative to the start moment of the time interval; and determines, when a time identifier of any data storage unit is the same as the time offset, the any data storage unit as the target data storage unit.

In a possible implementation, one data storage unit may store data in a fixed length, and a specific value of the fixed length may be set by a developer. In the block index table, block information of each block is stored in an order of a transaction occurrence time of a transaction included in the each block. When the time identifier matches the transaction occurrence time of the block, the node device may determine a time offset of the transaction occurrence time relative to the start moment of the time interval, and determine a storage location of block information of a target block in the block index table, that is, determine a target data storage unit storing the block information by multiplying the time offset by the fixed length.

The above-mentioned description of determining a target data storage unit is merely an exemplary description, and which method for determining the data storage unit is specifically adopted is not limited in this embodiment of the present disclosure.

In this embodiment of the present disclosure, one data storage unit stores block information of one block. The data storage unit is positioned according to the transaction occurrence time of the transaction included in the block, so that the accuracy of the obtained block information can be ensured, that is, storage locations of blocks can be accurately obtained, improving the accuracy of data query results.

At operation 703. The node device searches the target blockchain for the target block based on storage location information in the target data storage unit.

In a possible implementation, the storage location information may be represented as a block number. To be specific, after obtaining the block number, the node device may determine a subchain to which the target block belongs based on a subchain number in the block number, and determine an arrangement order of the target block in the subchain based on a sequence number in the block number,
positioning the target block in the subchain and obtaining data information in the target block.

In some embodiments, the data storage unit may further store a hash value of the target block, and the node device may verify the target block based on the hash value and the data information in the target block.

In the above-mentioned technical solutions, storage locations of blocks are recorded by using a block index table associated with the blockchain, so that data difficulties caused by block disorder in the blockchain can be effectively avoided,
improving the efficiency and accuracy of data query.

Any combination of the above-mentioned optional technical solutions may be used to form an optional embodiment of the present disclosure. Details are not described herein again.

Figure 8:
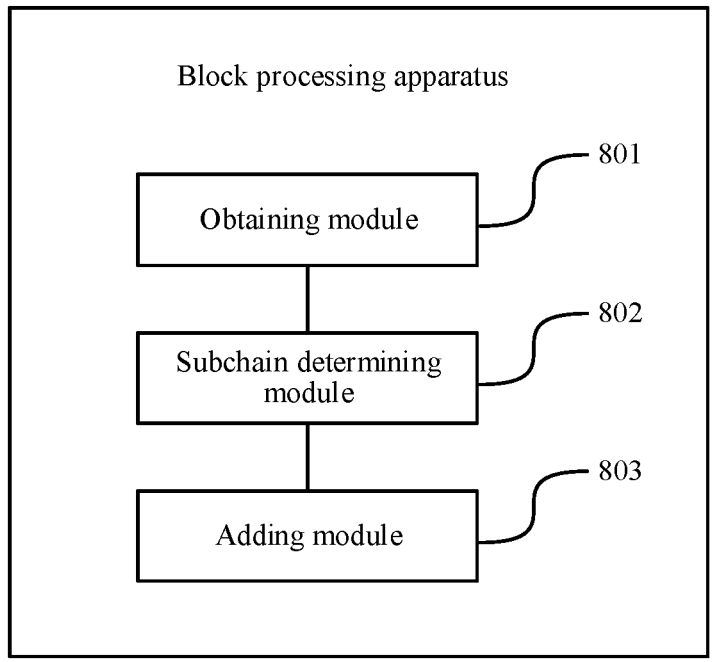
FIG. 8 is a schematic structural diagram of a block processing apparatus according to an embodiment of the present disclosure.

FIG. 8 is a schematic structural diagram of a block processing apparatus according to an embodiment of the present disclosure. Referring to FIG. 8, the apparatus includes:
an obtaining module 801, configured to obtain, in response to generation of any new block, a time interval stored in a root block of a target blockchain,
that is, the obtaining module 801 being configured to obtain, in response to generation of any block, a time interval stored in a root block of a target blockchain;
a subchain determining module 802, configured to determine, when a transaction occurrence time of a transaction included in the new block is within the time interval, the subchain meeting a target condition as a target subchain by traversing a first target quantity of subchains connected to the root block,
that is, the subchain determining module 802 being configured to determine, when a transaction occurrence time of a transaction included in the block is within the time interval, the subchain meeting a target condition from a first target quantity of subchains connected to the root block as a target subchain; and
an adding module 803, configured to add the new block to the target subchain of the target blockchain when consensus is reached on the new block,
that is, the adding module 803 being configured to add the block to the target subchain of the target blockchain when consensus is reached on the block.

In a possible implementation, the first target quantity is determined based on an average block consensus time and a block generation cycle in a blockchain system to which the target blockchain belongs.

In a possible implementation, the subchain determining module 802 is configured to:
determine quantities of blocks included in the subchains;
determine the subchain with a minimum quantity of the blocks as the target subchain in response to different quantities of the blocks included in the subchains; and
randomly determine one of the subchains as the target subchain in response to the same quantities of the blocks included in the subchains.

That is, the subchain determining module 802 is configured to:
determine quantities of blocks included in the subchains;
determine the subchain with a minimum quantity of the blocks as the target subchain in response to different quantities of the blocks included in the subchains; and
randomly determine one of the subchains as the target subchain in response to the same quantities of the blocks included in the subchains.

In a possible implementation, the adding module 803 is configured to:
determine a block number of the new block based on a subchain number of the target subchain and a sequence number of the block in the target subchain, the sequence number being used for indicating an arrangement order of the block in the target subchain, and the block number being used for indicating a storage location of the new block in the target blockchain; and
add the new block carrying the block number to the target subchain.

That is, the adding module 803 is configured to:
determine a block number of the new block based on a subchain number of the target subchain and a sequence number of the block in the target subchain, the sequence number being used for indicating an arrangement order of the block in the target subchain, and the block number being used for indicating a storage location of the new block in the target blockchain; and
add the new block carrying the block number to the target subchain.

In a possible implementation, the adding module 803 is configured to:
add one to a sequence number of a block with a maximum block height in the target subchain, to obtain a sequence number of the new block; and
splice the subchain number of the target subchain and the sequence number of the new block, to obtain a block number of the new block in the target blockchain.

That is, the adding module 803 is configured to:
add one to a sequence number of a block with a maximum block height in the target subchain, to obtain a sequence number of the block; and splice the subchain number of the target subchain and the sequence number of the block, to obtain a block number of the block in the target blockchain.

In a possible implementation, the apparatus further includes:
- a block determining module, configured to determine a previous block of the new block as a candidate block,
  that is, the block determining module being configured to determine a previous block of the block as a candidate block; and
- a comparison module, configured to compare a sequence number of the candidate block with a sequence number of the new block; and redetermine an adding location of the new block when the sequence number of the candidate block and the sequence number of the new block are not continuously incremented, and perform the operation of adding the new block to the target subchain,
  that is, the comparison module being configured to redetermine an adding location of the block when a sequence number of the candidate block and the sequence number of the block are not continuously incremented, and perform the operation of adding the block to the target subchain.

In a possible implementation, the apparatus further includes:
- an information storage module, configured to store storage location information of the new block to a block index table of the target blockchain, the block index table being used for recording block information of each block in the target blockchain.

That is, the information storage module is configured to store storage location information of the block to a block index table of the target blockchain, the block index table being used for recording block information of each block in the target blockchain.

In a possible implementation, the block index table includes a second target quantity of data storage units, and one data storage unit corresponds to one time identifier.

In a possible implementation, the information storage module is configured to:
  determine, when a time identifier of any data storage unit in the block index table matches the transaction occurrence time of the transaction included in the new block, the any data storage unit as a target data storage unit; and
  store the storage location information of the new block to the target data storage unit of the block index table.

That is, the information storage module is configured to:
  store the storage location information of the block to the target data storage unit of the block index table, a time identifier of the target data storage unit matching the transaction occurrence time of the transaction included in the block.

In the apparatus provided in this embodiment of the present disclosure, a time interval stored in a root block of a target blockchain is obtained in response to generation of any new block; when a transaction occurrence time of a transaction included in the new block is within the time interval, the subchain meeting a target condition is determined as a target subchain by traversing a first target quantity of subchains connected to the root block; and the new block is added to the target subchain of the target blockchain when consensus is reached on the new block. By using the above-mentioned apparatus, the blocks are connected to the blockchain according to a consensus time of the blocks without waiting for the completion of consensus of previously generated blocks. The blockchain includes a plurality of subchains, and the blocks can be added to the plurality of subchains at the same time, so that the block adding efficiency is improved, and the blocks can be added to the blockchain in time, ensuring the normal operation of the blockchain system.

When the block processing apparatus provided in the above-mentioned embodiment performs block processing, only division of the above-mentioned functional modules is used as an example for description. In the practical application, the functions may be allocated to and implemented by different functional modules according to requirements. That is, an internal structure of the apparatus is divided into different functional modules, to implement all or some of the functions described above. In addition, the block processing apparatus provided in the above-mentioned embodiment and the embodiments of the block processing method belong to the same conception. For a specific implementation process, reference may be made to the embodiments of the block processing method, and details are not described herein again.

Figure 9:
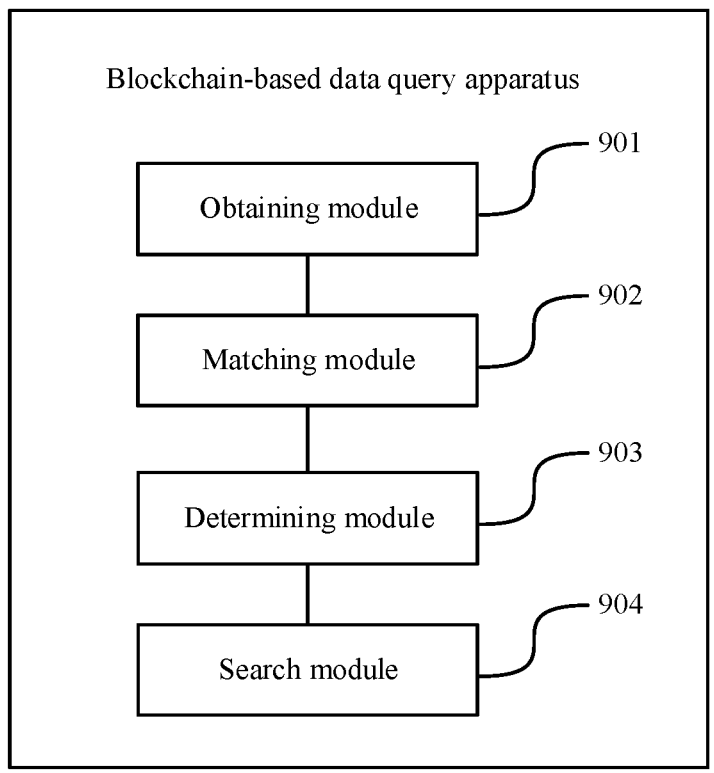
FIG. 9 is a schematic structural diagram of a blockchain-based data query apparatus according to an embodiment of the present disclosure.

FIG. 9 is a schematic structural diagram of a blockchain-based data query apparatus according to an embodiment of the present disclosure. Referring to FIG. 9, the apparatus includes:
- an obtaining module 901, configured to obtain a block index table of a target blockchain in response to a query instruction for a target block in the target blockchain, the query instruction carrying a transaction occurrence time of a transaction included in the target block, each data storage unit in the block index table being configured to record storage location information of each block in the target blockchain, and one data storage unit corresponding to one time identifier, that is, data storage units in the block index table being configured to record storage location information of blocks in the target blockchain;
- a matching module 902, configured to match time identifiers of the data storage units with the transaction occurrence time;
- a determining module 903, configured to determine a data storage unit corresponding to the time identifier that successfully matches the transaction occurrence time as a target data storage unit,
  that is, the determining module 903 being configured to determine a target data storage unit from the block index table, a time identifier of the target data storage unit matching the transaction occurrence time; and
- a search module 904, configured to search the target blockchain for the target block based on storage location information in the target data storage unit.

In a possible implementation, the matching module 902 is configured to:
  obtain a time interval stored in a root block of the target blockchain;
  determine a time offset of the transaction occurrence time relative to a start moment of the time interval; and
  determine, when any time identifier is the same as the time offset, that the any time identifier successfully matches the transaction occurrence time.

That is, the determining module 903 is configured to:
  obtain a time interval stored in a root block of the target blockchain;
  determine a time offset of the transaction occurrence time relative to a start moment of the time interval; and determine, when a time identifier of any data storage unit is the same as the time offset, the data storage unit as the target data storage unit.

When the blockchain-based data query apparatus provided in the above-mentioned embodiment performs data query based on the blockchain, only division of the above-mentioned functional modules is used as an example for description. In the practical application, the functions may be allocated to and implemented by different functional modules according to requirements. That is, an internal structure of the apparatus is divided into different functional modules, to implement all or some of the functions described above. In addition, the blockchain-based data query apparatus provided in the above-mentioned embodiment and the embodiments of the blockchain-based data query method belong to the same conception. For a specific implementation process, reference may be made to the embodiments of the blockchain-based data query method, and details are not described herein again.

Figure 10:
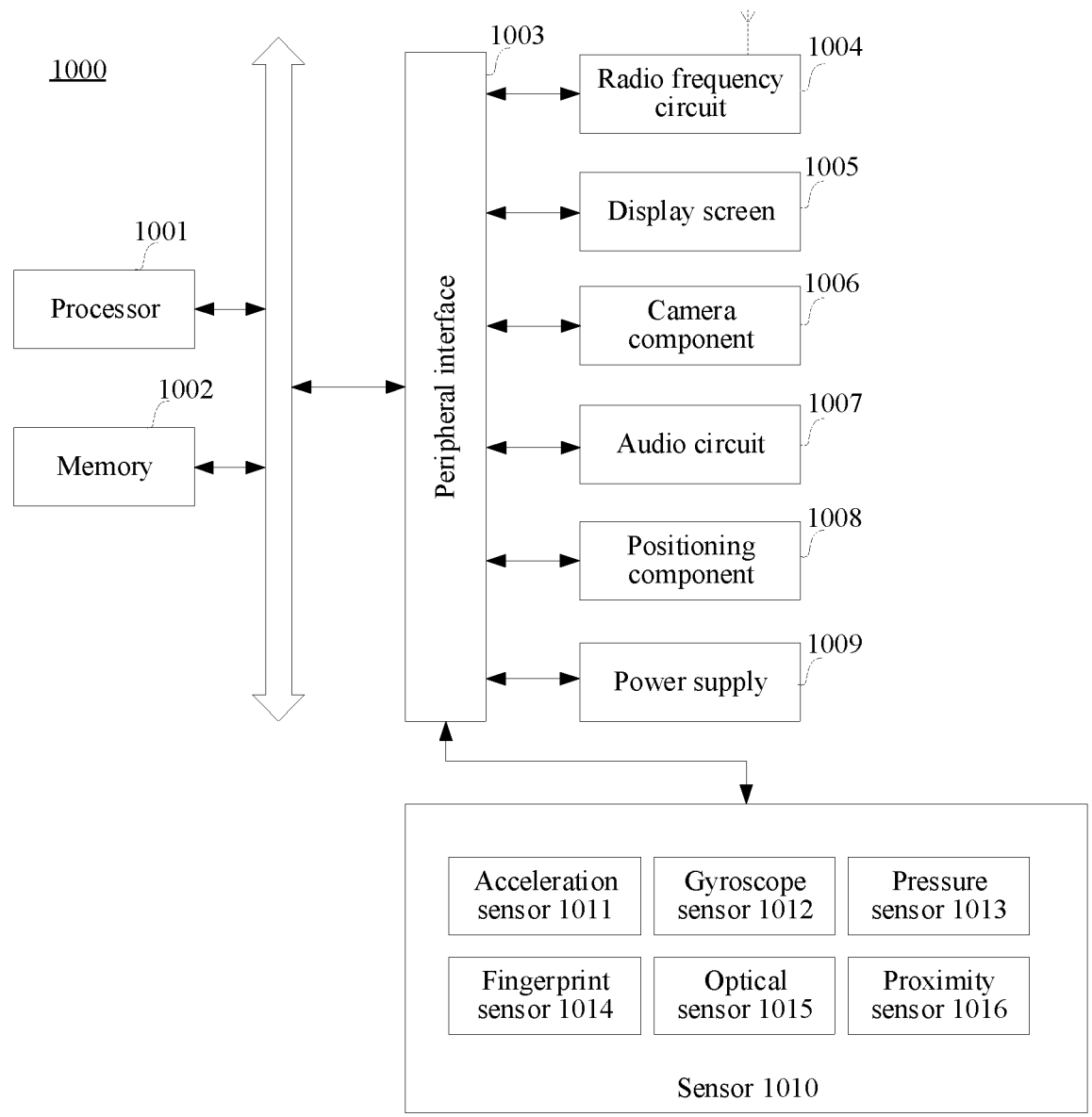
FIG. 10 is a schematic structural diagram of a terminal according to an embodiment of the present disclosure.

The node device provided in the above-mentioned technical solutions may be implemented as a terminal or a server. For example, FIG. 10 is a schematic structural diagram of a terminal according to an embodiment of the present disclosure. The terminal 1000 may be a smartphone, a tablet computer, an MP3 player, an MP4 player, a notebook computer, or a desktop computer. The terminal 1000 may also be referred to as user equipment, a portable terminal, a laptop terminal, a desktop terminal, or another name.

Generally, the terminal 1000 includes one or more processors 1001 and one or more memories 1002.

The processor 1001 may include one or more processing cores, for example, a 4-core processor or a 10-core processor. The processor 1001 may be implemented by using at least one hardware form of digital signal processing (DSP), a field-programmable gate array (FPGA), and a programmable logic array (PLA). The processor 1001 may alternatively include a main processor and a coprocessor. The main processor is configured to process data in an active state, also referred to as a central processing unit (CPU). The coprocessor is a low-power processor configured to process data in a standby state. In some embodiments, the processor 1001 may be integrated with a graphics processing unit (GPU). The GPU is configured to render and draw content that needs to be displayed on a display screen. In some embodiments, the processor 1001 may further include an AI processor. The AI processor is configured to process computing operations related to ML.

The memory 1002 may include one or more computer-readable storage media. The computer-readable storage medium may be non-transient. The memory 1002 may further include a high-speed random access memory (RAM), and a non-volatile memory such as one or more magnetic disk storage devices and a flash storage device. In some embodiments, a non-transitory computer-readable storage medium in the memory 1002 is configured to store at least one computer program, the at least one computer program being configured to be executed by the processor 1001 to implement the block processing method and the blockchain-based data query method provided in the method embodiments of the present disclosure.

In some embodiments, the terminal 1000 may optionally include a peripheral interface 1003 and at least one peripheral. The processor 1001, the memory 1002, and the peripheral interface 1003 may be connected by using a bus or a signal cable. Each peripheral may be connected to the peripheral interface 1003 by using a bus, a signal line, or a circuit board. Optionally, the peripheral includes: at least one of a radio frequency (RF) circuit 1004, a display screen 1005, a camera component 1006, an audio circuit 1007, a positioning component 1008, or a power supply 1009.

The peripheral interface 1003 may be configured to connect at least one peripheral related to input/output (I/O) to the processor 1001 and the memory 1002. In some embodiments, the processor 1001, the memory 1002, and the peripheral interface 1003 are integrated on the same chip or the same circuit board. In some other embodiments, any or both of the processor 1001, the memory 1002, and the peripheral interface 1003 may be implemented on an independent chip or circuit board. This is not limited in this embodiment.

The RF circuit 1004 is configured to receive and transmit an RF signal, which is also referred to as an electromagnetic signal. The RF circuit 1004 communicates with a communication network and other communication devices by using the electromagnetic signal. The RF circuit 1004 converts an electrical signal into an electromagnetic signal for transmission, or converts a received electromagnetic signal into an electrical signal. Optionally, the RF circuit 1004 includes: an antenna system, an RF transceiver, one or more amplifiers, a tuner, an oscillator, a digital signal processor, a codec chip set, a subscriber identity module card, or the like. The RF circuit 1004 may communicate with another terminal by using at least one wireless communication protocol. The wireless communication protocol includes, but is not limited to: a metropolitan area network, generations of mobile communication networks (2G, 3G, 4G, and 5G), a wireless local area network and/or a Wi-Fi network. In some embodiments, the RF circuit 1004 may further include a circuit related to NFC, which is not limited in the present disclosure.

The display screen 1005 is configured to display a user interface (UI). The UI may include a graph, a text, an icon, a video, and any combination thereof. When the display screen 1005 is a touch display screen, the display screen 1005 is further capable of collecting touch signals on or above a surface of the display screen 1005. The touch signal may be used as a control signal to be inputted into the processor 1001 for processing. In this case, the display screen 1005 may be further configured to provide a virtual button and/or a virtual keyboard, which is also referred to as a soft button and/or a soft keyboard. In some embodiments, there may be one display screen 1005 disposed on a front panel of the terminal 1000. In other embodiments, there may be at least two display screens 1005 disposed on different surfaces of the terminal 1000 respectively or in a folded design. In some embodiments, the display screen 1005 may be a flexible display screen disposed on a curved surface or a folded surface of the terminal 1000. Even, the display screen 1005 may be further set in a non-rectangular irregular pattern, that is, a special-shaped screen. The display screen 1005 may be made of materials such as a liquid crystal display (LCD), an organic light-emitting diode (OLED), or the like.

A camera component 1006 is configured to collect an image or a video. Optionally, the camera component 1006 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera component 1006 may further include a flash. The flash may be a single color temperature flash or a double color temperature flash. The double color temperature flash refers to a combination of a warm flash and a cold flash, and may be configured to perform light ray compensation at different color temperatures.

The audio circuit 1007 may include a microphone and a loudspeaker. The microphone is configured to acquire sound waves of a user and an environment, and convert the sound waves into an electrical signal to input to the processor 1001 for processing, or input to the RF circuit 1004 for implementing voice communication. For a purpose of stereo acquisition or noise reduction, there may be a plurality of microphones respectively disposed at different portions of the terminal 1000. The microphone may alternatively be an array microphone or an omni-directional acquisition type microphone. The loudspeaker is configured to convert electric signals from the processor 1001 or the RF circuit 1004 into sound waves. The loudspeaker may be a conventional thin-film loudspeaker or a piezoelectric ceramic loudspeaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 1007 may also include an earphone jack.

The positioning component 1008 is configured to position a current geographic location of the terminal 1000, to implement navigation or a location based service (LBS). The positioning component 1008 may be a positioning component based on the global positioning system (GPS) of the United States, the COMPASS System of China, the GLONASS System of Russia, or the GALILEO System of the European Union.

The power supply 1009 is configured to supply power to components in the terminal 1000. The power supply 1009 may be an alternating-current power supply, a direct-current power supply, a disposable battery, or a rechargeable battery. When the power supply 1009 includes a rechargeable battery, the rechargeable battery may be a wired rechargeable battery or a wireless rechargeable battery. The rechargeable battery may further be configured to support a fast charging technology.

In some embodiments, the terminal 1000 further includes one or more sensors 1010. The one or more sensors 1010 include, but are not limited to: an acceleration sensor 1011, a gyro sensor 1012, a pressure sensor 1013, a fingerprint sensor 1014, an optical sensor 1015, and a proximity sensor 1016.

The acceleration sensor 1011 may detect a magnitude of acceleration on three coordinate axes of a coordinate system established with the terminal 1000. For example, the acceleration sensor 1011 may be configured to detect components of gravity acceleration on the three coordinate axes. The processor 1001 may control, according to a gravity acceleration signal collected by the acceleration sensor 1011, the display screen 1005 to display the UI in a landscape view or a portrait view. The acceleration sensor 1011 may be further configured to collect data of a game or a user movement.

The gyroscope sensor 1012 may detect a body direction and a rotation angle of the terminal 1000, and may collect a 3D action of the user on the terminal 1000 together with the acceleration sensor 1011. The processor 1001 may implement the following functions according to the data acquired by the gyroscope sensor 1012: motion sensing (such as changing the UI according to a tilt operation of the user), image stabilization during shooting, game control, and inertial navigation.

The pressure sensor 1013 may be disposed at a side frame of the terminal 1000 and/or a lower layer of the display screen 1005. When the pressure sensor 1013 is disposed at the side frame of the terminal 1000, a holding signal of the user on the terminal 1000 may be detected. The processor 1001 performs left and right hand recognition or a quick operation according to the holding signal acquired by the pressure sensor 1013. When the pressure sensor 1013 is disposed on the low layer of the display screen 1005, the processor 1001 controls, according to a pressure operation of the user on the display screen 1005, an operable control on the UI. The operable control includes at least one of a button control, a scroll-bar control, an icon control, and a menu control.

The fingerprint sensor 1014 is configured to collect a user's fingerprint, and the processor 1001 identifies a user's identity according to the fingerprint collected by the fingerprint sensor 1014, or the fingerprint sensor 1014 identifies a user's identity according to the collected fingerprint. When the identity of the user is identified as a trusted identity, the processor 1001 authorizes the user to perform a related sensitive operation. The sensitive operation includes unlocking a screen, viewing encrypted information, downloading software, payment, changing settings, and the like. The fingerprint sensor 1014 may be disposed on a front surface, a back surface, or a side surface of the terminal 1000. When a physical button or a vendor logo is disposed on the terminal 1000, the fingerprint sensor 1014 may be integrated with the physical button or the vendor logo.

The optical sensor 1015 is configured to collect ambient light intensity. In an embodiment, the processor 1001 may control display luminance of the display screen 1005 according to the ambient light intensity collected by the optical sensor 1015. Optionally, Specifically, when the ambient light intensity is relatively high, the display brightness of the display 1005 is increased. When the ambient light intensity is relatively low, the display brightness of the display screen 1005 is reduced. In another embodiment, the processor 1001 may further dynamically adjust a camera parameter of the camera component 1006 according to the ambient light intensity collected by the optical sensor 1015.

The proximity sensor 1016, also referred to as a distance sensor, is usually disposed on a front panel of the terminal 1000. The proximity sensor 1016 is configured to collect a distance between a user and the front surface of the terminal 1000. In an embodiment, when the proximity sensor 1016 detects that the distance between the user and the front surface of the terminal 1000 gradually becomes small, the display screen 1005 is controlled by the processor 1001 to switch from a screen-on state to a screen-off state. When the proximity sensor 1016 detects that the distance between the user and the front surface of the terminal 1000 gradually increases, the display screen 1005 is controlled by the processor 1001 to switch from the screen-off state to the screen-on state.

A person skilled in the art may understand that the structure shown in FIG. 10 does not constitute a limitation on the terminal 1000 and that the terminal may include more or fewer components than those shown in the figure, a combination of some components, or different component arrangements.

Figure 11:
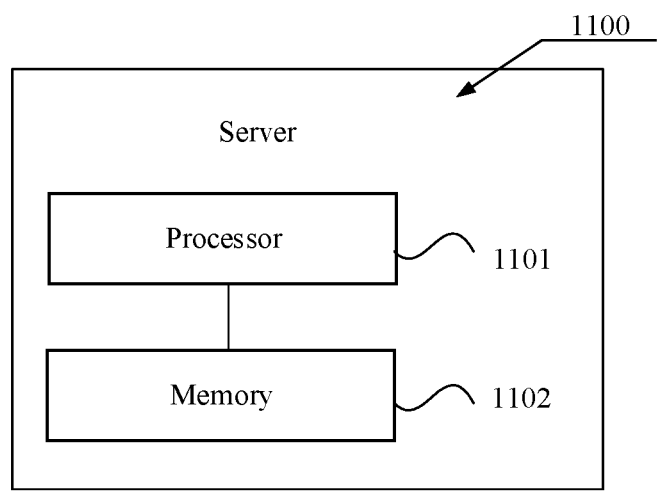
FIG. 11 is a schematic structural diagram of a server according to an embodiment of the present disclosure.

FIG. 11 is a schematic structural diagram of a server according to an embodiment of the present disclosure. The server 1100 may vary greatly because a configuration or performance varies, and may include one or more central processing units (CPU) 1101 and one or more memories 1102. The one or more memories 1102 store at least one computer program, and the at least one computer program is loaded and executed by the one or more processors 1101 to implement the methods provided in the above-mentioned various method embodiments. In some embodiments, the server 1100 may also have a wired or wireless network interface, a keyboard, an I/O interface and other components to facilitate I/O. The server 1100 may also include other components for implementing device functions. Details are not described herein again.

In some embodiments, the above-mentioned node device refers to a computer device. The computer device includes one or more processors and one or more memories storing at least one computer program, the at least one computer program being loaded and executed by the one or more processors to implement the following operations:

obtaining, in response to generation of any block, a time interval stored in a root block of a target blockchain;

determining, when a transaction occurrence time of a transaction included in the block is within the time interval, the subchain meeting a target condition from a first target quantity of subchains connected to the root block as a target subchain; and adding the block to the target subchain of the target blockchain when consensus is reached on the block.

In some embodiments, the first target quantity is determined based on an average block consensus time and a block generation cycle in a blockchain system to which the target blockchain belongs.

In some embodiments, the at least one computer program is loaded and executed by the one or more processors to implement the following operations:

determining quantities of blocks included in the subchains;

determining the subchain with a minimum quantity of the blocks as the target subchain in response to different quantities of the blocks included in the subchains; and randomly determining one of the subchains as the target subchain in response to the same quantities of the blocks included in the subchains.

In some embodiments, the at least one computer program is loaded and executed by the one or more processors to implement the following operations:

determining a block number of the block based on a subchain number of the target subchain and a sequence number of the block in the target subchain, the sequence number being used for indicating an arrangement order of the block in the target subchain, and the block number being used for indicating a storage location of the block in the target blockchain; and adding the block carrying the block number to the target subchain.

In some embodiments, the at least one computer program is loaded and executed by the one or more processors to implement the following operations:

adding one to a sequence number of a block with a maximum block height in the target subchain, to obtain a sequence number of the block; and splicing the subchain number of the target subchain and the sequence number of the block, to obtain a block number of the block in the target blockchain.

In some embodiments, the at least one computer program is loaded and executed by the one or more processors to implement the following operations:

determining a previous block of the block as a candidate block; and redetermining an adding location of the block when a sequence number of the candidate block and the sequence number of the block are not continuously incremented, and perform the operation of adding the block to the target subchain.

In some embodiments, the at least one computer program is loaded and executed by the one or more processors to implement the following operations:

storing storage location information of the block to a block index table of the target blockchain, the block index table being used for recording block information of each block in the target blockchain.

In some embodiments, the block index table includes a second target quantity of data storage units, and one data storage unit corresponds to one time identifier.

In some embodiments, the at least one computer program is loaded and executed by the one or more processors to implement the following operations:

store storage location information of the block to a target data storage unit of the block index table, a time identifier of the target data storage unit matching the transaction occurrence time of the transaction included in the block.

In some other embodiments, the above-mentioned node device refers to a computer device. The computer device includes one or more processors and one or more memories storing at least one computer program, the at least one computer program being loaded and executed by the one or more processors to implement the following operations:

obtaining a block index table of a target blockchain in response to a query instruction for a target block in the target blockchain, the query instruction carrying a transaction occurrence time of a transaction included in the target block, data storage units in the block index table being configured to record storage location information of blocks in the target blockchain, and one data storage unit corresponding to one time identifier;

determining a target data storage unit from the block index table, a time identifier of the target data storage unit matching the transaction occurrence time; and searching the target blockchain for the target block based on storage location information in the target data storage unit.

In some other embodiments, the at least one computer program is loaded and executed by the one or more processors to implement the following operations:

obtaining a time interval stored in a root block of the target blockchain;

determining a time offset of the transaction occurrence time relative to a start moment of the time interval; and determining, when a time identifier of any data storage unit is the same as the time offset, the data storage unit as the target data storage unit.

In an exemplary embodiment, a computer-readable storage medium, for example, a memory including at least one computer program is further provided. The at least one computer program may be executed by a processor to implement the block processing method or the blockchain-based data query method provided in the foregoing embodiments. For example, the computer-readable storage medium may be a read-only memory (ROM), a RAM, a compact disc ROM (CD-ROM), a magnetic tape, a floppy disk, or an optical data storage device.

In some embodiments, the at least one computer program is loaded and executed by a processor to implement the following operations:

obtaining, in response to generation of any block, a time interval stored in a root block of a target blockchain;

determining, when a transaction occurrence time of a transaction included in the block is within the time interval, the subchain meeting a target condition from a first target quantity of subchains connected to the root block as a target subchain; and adding the block to the target subchain of the target blockchain when consensus is reached on the block.

In some embodiments, the first target quantity is determined based on an average block consensus time and a block generation cycle in a blockchain system to which the target blockchain belongs.

In some embodiments, the at least one computer program is loaded and executed by a processor to implement the following operations:

determining quantities of blocks included in the subchains;

determining the subchain with a minimum quantity of the blocks as the target subchain in response to different quantities of the blocks included in the subchains; and randomly determining one of the subchains as the target subchain in response to the same quantities of the blocks included in the subchains.

In some embodiments, the at least one computer program is loaded and executed by a processor to implement the following operations:

determining a block number of the block based on a subchain number of the target subchain and a sequence number of the block in the target subchain, the sequence number being used for indicating an arrangement order of the block in the target subchain, and the block number being used for indicating a storage location of the block in the target blockchain; and adding the block carrying the block number to the target subchain.

In some embodiments, the at least one computer program is loaded and executed by a processor to implement the following operations:

adding one to a sequence number of a block with a maximum block height in the target subchain, to obtain a sequence number of the block; and splicing the subchain number of the target subchain and the sequence number of the block, to obtain a block number of the block in the target blockchain.

In some embodiments, the at least one computer program is loaded and executed by a processor to implement the following operations:

determining a previous block of the block as a candidate block; and redetermining an adding location of the block when a sequence number of the candidate block and the sequence number of the block are not continuously incremented, and perform the operation of adding the block to the target subchain.

In some embodiments, the at least one computer program is loaded and executed by a processor to implement the following operations:

storing storage location information of the block to a block index table of the target blockchain, the block index table being used for recording block information of each block in the target blockchain.

In some embodiments, the block index table includes a second target quantity of data storage units, and one data storage unit corresponds to one time identifier.

In some embodiments, the at least one computer program is loaded and executed by a processor to implement the following operations:

storing the storage location information of the block to a target data storage unit of the block index table, a time identifier of the target data storage unit matching the transaction occurrence time of the transaction included in the block.

In some other embodiments, the at least one computer program is loaded and executed by a processor to implement the following operations:

obtaining a block index table of a target blockchain in response to a query instruction for a target block in the target blockchain, the query instruction carrying a transaction occurrence time of a transaction included in the target block, data storage units in the block index table being configured to record storage location information of blocks in the target blockchain, and one data storage unit corresponding to one time identifier;

determining a target data storage unit from the block index table, a time identifier of the target data storage unit matching the transaction occurrence time; and searching the target blockchain for the target block based on storage location information in the target data storage unit.

In some other embodiments, the at least one computer program is loaded and executed by a processor to implement the following operations:

obtaining a time interval stored in a root block of the target blockchain;

determining a time offset of the transaction occurrence time relative to a start moment of the time interval; and determining, when a time identifier of any data storage unit is the same as the time offset, the data storage unit as the target data storage unit.

In some embodiments, a computer program or computer program product including at least one program code is further provided, the computer program or computer program product, when run on a computer device, causing the computer device to perform any possible implementation in the block processing method or the blockchain-based data query method provided in the foregoing embodiments. Details are not described herein again.

A person of ordinary skill in the art may understand that all or some of the operations of the foregoing embodiments may be implemented by hardware, or may be implemented by a computer program instructing relevant hardware. The computer program may be stored in a computer-readable storage medium. The storage medium may be a ROM, a magnetic disk, an optical disc, or the like.

The foregoing descriptions are embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A block processing method, comprising:

obtaining, based on generation of a block, a time interval stored in a root block of a target blockchain;

based on a transaction occurrence time of a transaction included in the block being within the time interval, determining, as a target subchain, a subchain meeting a target condition from a first target quantity of subchains connected to the root block,
wherein the determining comprises randomly determining a first subchain with a minimum quantity of the blocks as the target subchain when a plurality of subchains have the minimum quantity of the blocks; and
adding the block to the target subchain of the target blockchain based on a consensus being reached on the block.

2. The method according to claim 1, wherein the first target quantity of subchains is determined based on an average block consensus time and a block generation cycle in a blockchain system to which the target blockchain belongs.

3. The method according to claim 1, wherein the adding the block to the target subchain comprises:
determining a block number of the block based on a subchain number of the target subchain and a sequence number of the block in the target subchain, the sequence number being used for indicating an arrangement order of the block in the target subchain, and the block number being used for indicating a storage location of the block in the target blockchain; and
adding the block carrying the block number to the target subchain.

4. The method according to claim 3, wherein the determining the block number of the block based on the subchain number of the target subchain and the sequence number of the block in the target subchain comprises:
adding one to a sequence number of a block with a maximum block height in the target subchain, to obtain the sequence number of the block; and
splicing the subchain number of the target subchain and the sequence number of the block, to obtain the block number of the block in the target blockchain.

5. The method according to claim 4, further comprising:
determining a previous block of the block as a candidate block; and
redetermining an adding location of the block based on a sequence number of the candidate block and the sequence number of the block not being continuously incremented, and performing an operation of adding the block to the target subchain.

6. The method according to claim 1, further comprising:
storing storage location information of the block to a block index table of the target blockchain, the block index table being used for recording block information of each block in the target blockchain.

7. The method according to claim 6, wherein the block index table comprises a second target quantity of data storage units, and one data storage unit corresponds to one time identifier.

8. The method according to claim 7, wherein the storing storage location information of the block to the block index table of the target blockchain comprises:
storing the storage location information of the block to a target data storage unit of the block index table, a time identifier of the target data storage unit matching the transaction occurrence time of the transaction included in the block.

9. A blockchain-based data query method, comprising:
obtaining a block index table of a target blockchain based on a query instruction for a target block in the target blockchain, the query instruction carrying a transaction occurrence time of a transaction included in the target block, data storage units in the block index table being configured to record storage location information of blocks in the target blockchain, and one data storage unit corresponding to one time identifier;
determining a target data storage unit from the block index table, a time identifier of the target data storage unit matching the transaction occurrence time,
wherein the determining the target data storage unit from the block index table comprises:
obtaining a time interval stored in a root block of the target blockchain,
determining a time offset of the transaction occurrence time relative to a start moment of the time interval, and
determining based on a time identifier of any data storage unit being the same as the time offset, the data storage unit as the target data storage unit; and
searching the target blockchain for the target block based on storage location information in the target data storage unit.

10. An apparatus for block processing, the apparatus comprising:
at least one memory configured to store computer program code;
at least one processor configured to access the computer program code and operate as instructed by the computer program code, the computer program code including:
first obtaining code configured to cause the at least one processor to obtain, based on generation of a block, a time interval stored in a root block of a target blockchain;
first determining code configured to cause the at least one processor to, based on a transaction occurrence time of a transaction included in the block being within the time interval, determine, as a target subchain, a subchain meeting a target condition from a first target quantity of subchains connected to the root block,
wherein the first determining code comprising comprises randomly determining a first subchain with a minimum quantity of the blocks as the target subchain when a plurality of subchains have the minimum quantity of the blocks; and
first adding code configured to cause the at least one processor to add, the block to the target subchain of the target blockchain based on a consensus being reached on the block.

11. The apparatus of claim 10, wherein the first target quantity of subchains is determined based on an average block consensus time and a block generation cycle in a blockchain system to which the target blockchain belongs.

12. The apparatus of claim 10, wherein the first adding code comprises:
second determining code configured to cause the at least one processor to determine a block number of the block based on a subchain number of the target subchain and a sequence number of the block in the target subchain, the sequence number being used for indicating an arrangement order of the block in the target subchain, and the block number being used for indicating a storage location of the block in the target blockchain; and
second adding code configured to cause the at least one processor to add the block carrying the block number to the target subchain.

13. The apparatus of claim 12, wherein the fifth determining code comprises:
third adding code configured to cause the at least one processor to add one to a sequence number of a block with a maximum block height in the target subchain, to obtain the sequence number of the block; and first splicing code configured to cause the at least one processor to splice the subchain number of the target subchain and the sequence number of the block, to obtain the block number of the block in the target blockchain.

14. The apparatus of claim 13, wherein the first adding code further comprises:

third determining code configured to cause the at least one processor to determine a previous block of the block as a candidate block; and fourth determining code configured to cause the at least one processor to redetermine an adding location of the block based on a sequence number of the candidate block and the sequence number of the block not being continuously incremented, and performing an operation of adding the block to the target subchain.

15. The apparatus of claim 10, the computer program code further comprising first storing code configured to cause the at least one processor to store storage location information of the block to a block index table of the target blockchain, the block index table being used for recording block information of each block in the target blockchain.

16. The apparatus of claim 15, wherein the block index table comprises a second target quantity of data storage units, and one data storage unit corresponds to one time identifier.

17. The apparatus of claim 16, wherein the first storing code comprises:

second storing code configured to cause the at least one processor to store the storage location information of the block to a target data storage unit of the block index table, a time identifier of the target data storage unit matching the transaction occurrence time of the transaction included in the block.

\* \* \* \* \*